(12) United States Patent
Kurakata et al.

(10) Patent No.: US 11,838,481 B2
(45) Date of Patent: Dec. 5, 2023

(54) IMAGE READING APPARATUS AND IMAGE FORMING APPARATUS

(71) Applicants: Takahiro Kurakata, Kanagawa (JP); Yuuki Nakada, Kanagawa (JP)

(72) Inventors: Takahiro Kurakata, Kanagawa (JP); Yuuki Nakada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/823,547

(22) Filed: Aug. 31, 2022

(65) Prior Publication Data

US 2023/0156139 A1 May 18, 2023

(30) Foreign Application Priority Data

Nov. 15, 2021 (JP) ................................. 2021-185911

(51) Int. Cl.
*H04N 1/401* (2006.01)
*H04N 1/00* (2006.01)
(Continued)

(52) U.S. Cl.
CPC ......... *H04N 1/401* (2013.01); *H04N 1/00814* (2013.01); *H04N 1/02835* (2013.01); *G01K 13/00* (2013.01); *H04N 2201/0081* (2013.01)

(58) Field of Classification Search
CPC .. H04N 1/02835; H04N 1/04; H04N 1/02815; H04N 1/0289; H04N 1/0318; H04N 2201/03125; H04N 2201/03141; H04N 2201/03145; H04N 1/02895; H04N 1/1017; H04N 2201/03133; H04N 1/02865; H04N 1/401; H04N 2201/03112; H04N 1/028; H04N 1/0281; H04N 2201/0081; H04N 1/02885; H04N 1/40056;
(Continued)

(56) References Cited

U.S. PATENT DOCUMENTS

| 5,612,794 A * | 3/1997 | Brandestini .......... H04N 1/3875 358/509 |
| 8,736,922 B2 * | 5/2014 | Ohara .................. H04N 1/4076 358/475 |

(Continued)

FOREIGN PATENT DOCUMENTS

| JP | 10-107961 | 4/1998 |
| JP | 2006-013852 | 1/2006 |

(Continued)

*Primary Examiner* — Negussie Worku
(74) *Attorney, Agent, or Firm* — IPUSA, PLLC

(57) ABSTRACT

An image reading apparatus includes a light emitter to irradiate a document with light, a first light guide to guide the light reflected by the document, an output device to output a readout signal obtained from the light reflected and guided by the first light guide, a base to correct shading in the readout signal, and circuitry to output a scanned image in which the shading of the document in the readout signal is corrected, based on correction data obtained from the readout signal of the base output from the output device, control a timing at which the light emitter emits the light and a timing at which the output device outputs a signal, and heat the first light guide with the light emitted from the light emitter before the output device outputs the readout signal of each of the document and the base.

9 Claims, 8 Drawing Sheets

(51) Int. Cl.
*H04N 1/028* (2006.01)
*G01K 13/00* (2021.01)

(58) Field of Classification Search
CPC ............... H04N 1/0285; H04N 1/0288; H04N 1/02855; H04N 1/193; H04N 1/4076; H04N 1/00525; H04N 1/00559; H04N 1/12; H04N 2201/0094; H04N 2201/03137; H04N 2201/03166; H04N 2201/03175; H04N 1/00761; H04N 1/0286; H04N 1/0303; H04N 1/0305; H04N 1/1061; H04N 2201/0452; H04N 1/00806; H04N 1/00822; H04N 1/02845; H04N 1/0287; H04N 1/03; H04N 1/103; H04N 2201/0418; H04N 1/00; H04N 1/00005; H04N 1/00013; H04N 1/00278; H04N 1/00742; H04N 1/00763; H04N 1/00795; H04N 1/1013; H04N 1/48; H04N 2201/0312; H04N 2201/03129; H04N 2201/03187; H04N 2201/0404; H04N 1/1215; H04N 1/19; H04N 1/4097; H04N 2201/02456; H04N 2201/0246; H04N 2201/02483; H04N 2201/02485; H04N 2201/02493; F21V 13/04; G03G 15/00; G03G 15/0409; G03G 15/04; G03B 27/16; G03B 27/54; G06Q 20/042; G06T 1/00
USPC ........................................................ 358/474
See application file for complete search history.

(56) References Cited

U.S. PATENT DOCUMENTS

| | | | | |
|---|---|---|---|---|
| 8,788,002 | B2* | 7/2014 | LeBoeuf | A61B 5/11 600/310 |
| 11,480,906 | B2* | 10/2022 | Ino | G03G 15/5041 |
| 2007/0165288 | A1* | 7/2007 | Ikeno | H04N 1/484 358/482 |
| 2008/0122736 | A1* | 5/2008 | Ronzani | G02B 27/0176 345/8 |
| 2012/0162729 | A1* | 6/2012 | Kurakata | H04N 1/00716 358/448 |
| 2013/0170000 | A1* | 7/2013 | Kurakata | H04N 1/04 358/461 |
| 2014/0078532 | A1* | 3/2014 | Nikaku | H04N 1/00814 358/1.13 |
| 2014/0111835 | A1* | 4/2014 | Ozawa | H04N 1/02815 358/475 |
| 2014/0320938 | A1* | 10/2014 | Kojo | H04N 1/00761 358/475 |
| 2015/0156372 | A1* | 6/2015 | Aramaki | H04N 1/02895 358/447 |
| 2018/0103168 | A1* | 4/2018 | Sakuma | H04N 1/0066 |
| 2020/0336689 | A1* | 10/2020 | Akagi | H04N 25/745 |
| 2021/0234970 | A1 | 7/2021 | Kurakata | |

FOREIGN PATENT DOCUMENTS

| | | |
|---|---|---|
| JP | 2014-175710 | 9/2014 |
| JP | 2019-153867 | 9/2019 |

* cited by examiner

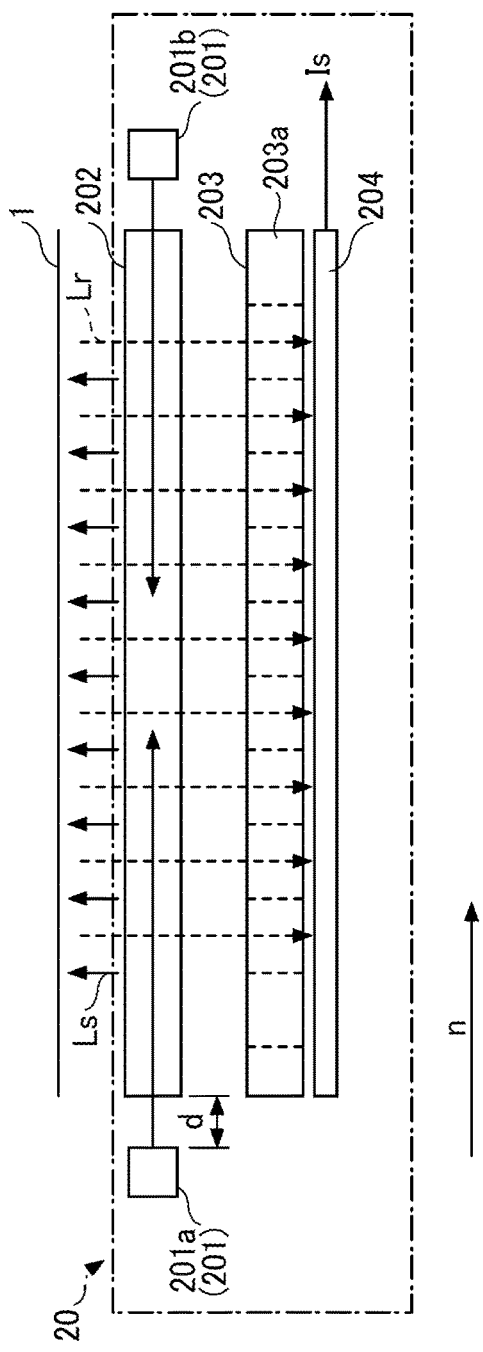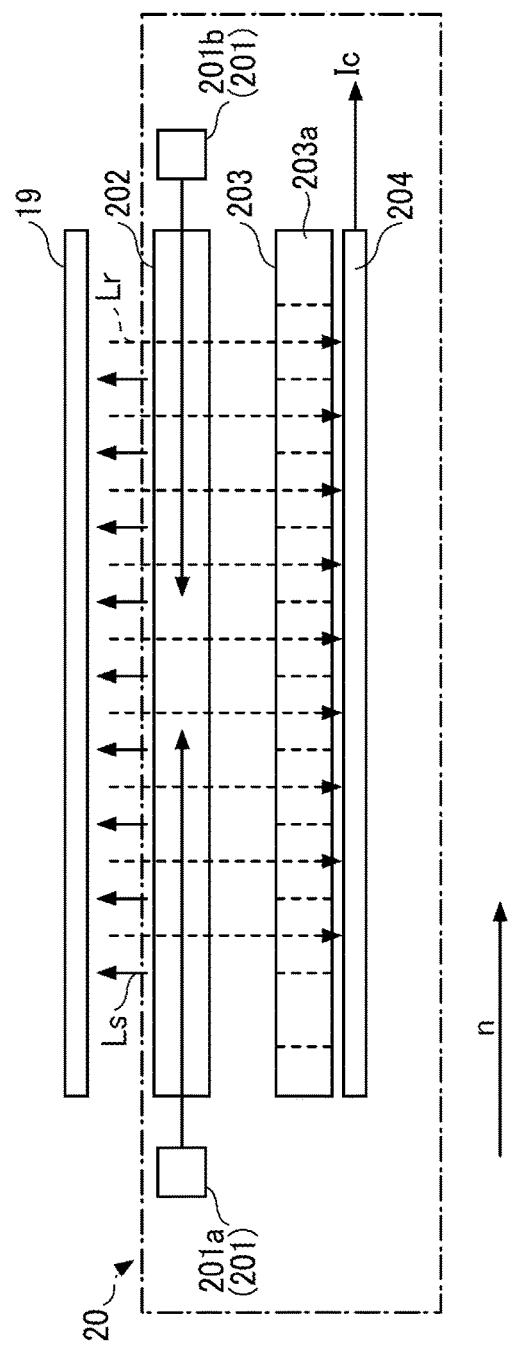

ID_READING APPARATUS AND IMAGE
FORMING APPARATUS

CROSS-REFERENCE TO RELATED APPLICATION

This patent application is based on and claims priority pursuant to 35 U.S.C. § 119(a) to Japanese Patent Application No. 2021-185911, filed on Nov. 15, 2021, in the Japan Patent Office, the entire disclosure of which is hereby incorporated by reference herein.

BACKGROUND

Technical Field

Embodiments of the present disclosure relate to an image reading apparatus and an image forming apparatus.

Background Art

In the related art, some technologies have been proposed that correct the shading on the scanned image based on the correction data obtained from the readout signal of a base in an image reading apparatus that outputs the scanned image of a document. The term shading used herein refers to the unevenness in brightness.

In the above technologies that correct the shading, the power consumption is controlled in order to reduce the error in correction according to the temperature characteristics of an image sensor, and the corrected data is obtained in a state where the temperature of the image sensor is increased. Then, the shading on the scanned image of a document, which is obtained by the image sensor, is corrected based on the correction data.

SUMMARY

Embodiments of the present disclosure described herein provide an image reading apparatus includes a light emitter to irradiate a document with light, a first light guide to guide the light reflected by the document, an output device to output a readout signal obtained from the light reflected and guided by the first light guide, a base to correct shading in the readout signal, and circuitry to output a scanned image in which the shading of the document in the readout signal is corrected, based on correction data obtained from the readout signal of the base output from the output device, control a timing at which the light emitter emits the light and a timing at which the output device outputs a signal, heat the first light guide with the light emitted from the light emitter before the output device outputs the readout signal of each of the document and the base, and correct the shading in the readout signal of the document output from the output device when the first light guide is heated, based on the correction data obtained when the first light guide is heated.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 3 is a diagram illustrating a configuration of a first reader according to the first embodiment of the present disclosure.

FIG. 4 is a diagram illustrating the shading correction using a first reading roller, according to an embodiment of the present disclosure.

Figure 1:
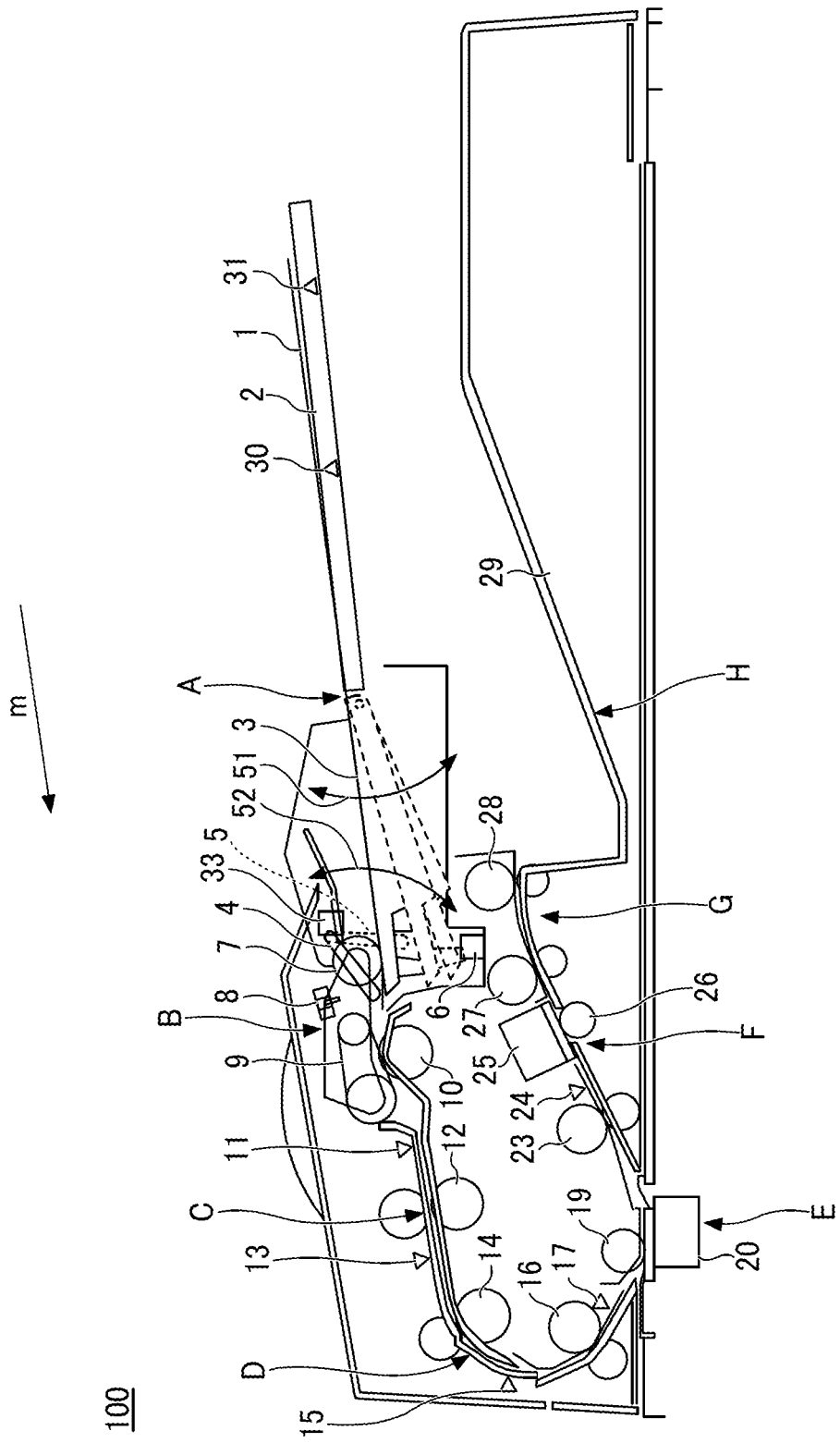
FIG. 1 is a diagram illustrating a configuration of an image reading apparatus according to an embodiment of the present disclosure, and is a sectional view of the image reading apparatus.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image reading apparatus and an image forming apparatus according to an embodiment of the present disclosure will be described below in detail with reference to the accompanying drawings. An image reading apparatus and an image forming apparatus according to embodiments of the present disclosure are described below to implement the technical ideas, and no limitation is indicated to the embodiments of the present disclosure given below.

For example, the size, material, and shape of components and the relative positions of the arranged components are given by way of example in the following description, and the scope of the present disclosure is not limited thereto unless particularly specified. For example, the size of these elements and the relative positions of these elements may be exaggerated for purposes of illustration in the drawings. In the description given below with reference to the drawings,

First Embodiment

A configuration of an image reading apparatus 100 according to a first embodiment of an embodiment of the present disclosure is described below with reference to FIG. 1 and FIG. 2.

FIG. 1 is a diagram illustrating a configuration of the image reading apparatus 100 according to the present embodiment, and is a sectional view of the image reading apparatus 100 viewed in a direction parallel to the rotation axis of a conveyance roller used for the conveyance of a document 1.

Figure 2:
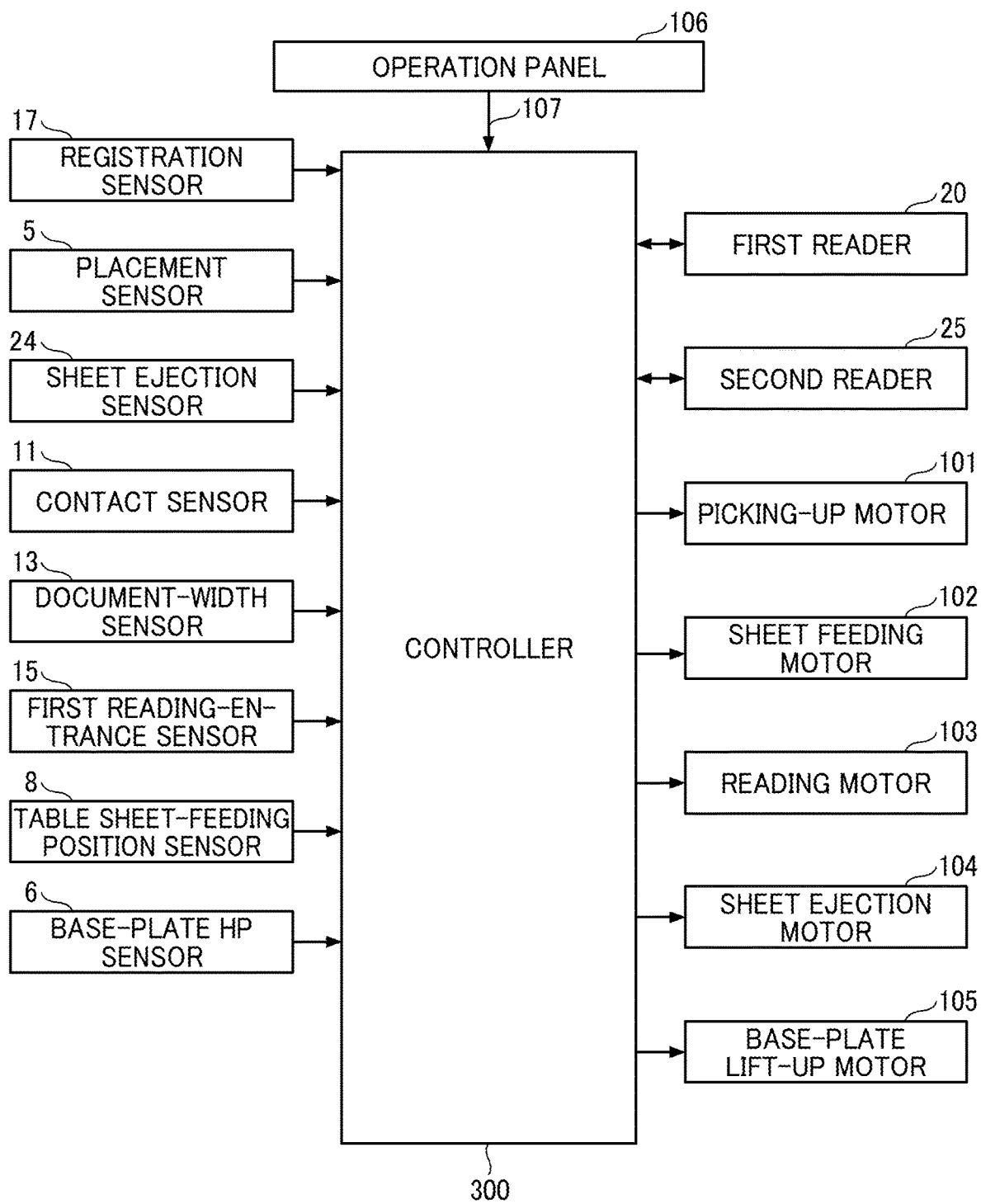
FIG. 2 is a block diagram illustrating a configuration of an image reading apparatus according to the first embodiment of the present disclosure.

FIG. 2 is a block diagram illustrating a configuration of the image reading apparatus 100 according to the present embodiment.

The image reading apparatus 100 according to the present embodiment scans the document 1, which is a to-be-scanned object, while conveying the document 1 in a conveyance direction m at a predetermined speed, and outputs a scanned image obtained as a result of the scanning performed on the document 1.

In the present embodiment, the image reading apparatus 100 serves as an automatic document feeder (ADF).

As illustrated in FIG. 1, schematically, the image reading apparatus 100 mainly includes a document placement unit A, a sheet separating and feeding part B, a registration part C, a reversing unit D, a first reading and conveying part E, a second reading and conveying part F, a sheet ejection unit G, and a stacking unit H.

The document placement unit A is a portion on which a document 1 to be read is placed. The document 1 may be a single sheet of document or a bundle of documents in which a plurality of documents are stacked. The document placement unit A includes a document table 2, a placement feeler 4, a placement sensor 5, a base-plate home position (HP) sensor 6, a document length sensor 30, and a document length sensor 31.

The document table 2 according to the present embodiment includes a movable document table 3 that is movable such that the document 1 can be placed according to the size of the document 1.

For example, the document 1 is placed on the document table 2 such that one document plane faces vertically upward. Both ends of the document 1 in a direction intersecting with the conveyance direction m are pressed by a pair of side guides, and the relative position of the document 1 is determined. The placement feeler 4 and the placement sensor 5 detect that the document 1 is placed on the document table 2 and output a placement detection signal.

The document length sensor 30 and the document length sensor 31 detect the length of the document 1 placed on the document table 2 in the conveyance direction m and output a length detection signal. The length detection signal is used to determine whether the document 1 placed on the document table 2 is vertically placed or horizontally placed. The document length sensor 30 and the document length sensor 31 are disposed such that these sensors can detect the length of the document 1.

Each one of the document length sensor 30 and the document length sensor 31 may be, for example, a reflection sensor that outputs an electrical signal that indicates the radiation intensity of the light reflected by the document 1 or an actuator sensor that can detect the length of the document 1 even if the document 1 is a single sheet. The base-plate HP sensor 6 detects the HP of the base-plate, that is, the initial position.

The movable document table 3 can be moved in a direction indicated by the arrow of a first movable direction 51 by a base-plate lift-up motor 105 (see FIG. 2). As the base-plate lift-up motor 105 rotates in forward direction in response to, for example, a placement detection signal output from the placement feeler 4 and the placement sensor 5, the movable document table 3 is lifted such that the uppermost surface of the document 1 contacts the picking-up roller 7.

The separating and feeding unit B is an element that has a function to feed the document 1 placed on the document placement unit A. When the document 1 is a bundle of documents, the separating and feeding unit B separates and feeds the documents on a one-by-one basis from the bundle of documents. The separating and feeding portion B includes a picking-up roller 7, a table sheet-feeding position sensor 8, a sheet feeding belt 9, and a reverse roller 10.

The picking-up roller 7 is moved in a direction indicated by arrow of a second movable direction 52 by a picking-up motor 101 (see FIG. 2) and a cam mechanism, and is pressed by the upper side of the document 1 moved by the movable document table 3. The table sheet-feeding position sensor 8 outputs a position detection signal indicating the position of the picking-up roller 7.

The sheet feeding belt 9 is driven by the rotation in forward direction of a sheet feeding motor 102 (see FIG. 2). Accordingly, the reverse roller 10 is driven to rotate in a direction opposite to the conveyance direction m, i.e., a clockwise direction in FIG. 1, by the rotation in forward direction of the sheet feeding motor 102. The separating and feeding portion B drives the sheet feeding belt 9 and the reverse roller 10 to separate the uppermost one of the documents 1 and the rest of the documents 1 placed below. By so doing, only the uppermost one of the documents 1 can be fed.

More specifically, the reverse roller 10 contacts the sheet feeding belt 9 at predetermined pressure, and the reverse roller 10 is driven to rotate in the counterclockwise direction in accordance with the rotation of the sheet feeding belt 9 when the reverse roller 10 directly contacts the sheet feeding belt 9 or when the reverse roller 10 directly contacts the sheet feeding belt 9 through one sheet of document 1. The force of corotation is set in advance to be lower than the torque of the torque limiter, and if two or more sheets of documents 1 enter the nip between the sheet feeding belt 9 and the reverse roller 10, the reverse roller 10 rotates in a clockwise direction, which is the original direction of rotation, and the excessive ones of the multiple documents 1 are pushed back. Due to such a configuration and function, multiple feeding can be prevented from occurring. The document 1 that is separated into one sheet by the sheet feeding belt 9 and the reverse roller 10 is conveyed by the sheet feeding belt 9 toward the registration part C in the conveying direction m.

The registration part C is an element that has a function to primarily contact the document 1 fed from the sheet separating and feeding part B and a function to draw out and convey the document 1 that has contacted a sensor. The registration part C includes a contact sensor 11, a pull-out roller pair 12, and a document-width sensor 13.

The front end of the document 1 that is conveyed by the separating and feeding portion B is detected by the contact sensor 11, and the document 1 is further conveyed and contacts the pull-out roller pair 12 that is not rotating.

Subsequently, the document 1 is conveyed by a predetermined distance in accordance with the contact detection signal output from the contact sensor 11. Subsequently, the document 1 is stopped in a state of being pressed against the pull-out roller pair 12 with a predetermined deflection. While the document 1 is stopped, the front end of the document 1 enters the nip formed by the rollers of the pull-out roller pair 12, and skew adjustment is performed to align the front end of the document 1.

The pull-out roller pair 12 is driven by the reverse rotation of the sheet feeding motor 102 (see FIG. 2) to convey the skew-corrected document 1 to the position of the intermediate roller pair 14. When the sheet feeding motor 102 rotates in the reverse direction, the pull-out roller pair 12 and the intermediate roller pair 14 are driven, but the picking-up roller 7 and the sheet feeding belt 9 are not driven.

A plurality of document-width sensors 13 are arranged in the width direction of the document 1 to detect the length of the document 1 conveyed by the pull-out roller pair 12 in the width direction. The length of the document 1 in the conveyance direction m is detected based on the result of the detection of the front end and trailing end of the document 1 performed by the contact sensor 11.

The reversing unit D is an element that has a function to reverse the document 1 being conveyed and convey the document 1 such that the to-be-scanned side of the document will face the first reading and conveying part E side in FIG. 1. The reversing unit D includes an intermediate roller pair 14. The intermediate roller pair 14 includes a pair of rollers, and the document 1 is nipped and conveyed by the pair of rollers.

The document 1 is conveyed from the registration portion C to the reversing unit D by driving of the pull-out roller pair 12 and the intermediate roller pair 14. The conveyance speed in the registration section C is predetermined to be faster than the conveyance speed in the first reading conveyance section E. Thus, the processing time for feeding the document 1 to the first reading conveyance section E can be shortened.

The first reading and conveying part E is an element that has a function to scan one side of the being-conveyed document 1 from the other side of the document 1 across the contact glass. In the following description, this side of the document may be referred to as the front side of the document 1. The first reading and conveying part E outputs the read image of the front side of the document 1.

The first reading and conveying part E includes a first reading-entrance sensor 15, a first reading-entrance roller pair 16, a registration sensor 17, a first reading roller 19, a first reader 20, and a first reading-exit roller pair 23. When the front end of the document 1 in the conveyance direction m is detected by the first reading-entrance sensor 15, the first reading and conveying part E starts deceleration to make the conveyance speed of the document 1 approximately equivalent to the scanning speed before the front end of the document 1 enters the nip between the pair of rollers of the first reading-entrance roller pair 16. Together with that, the first reading and conveying part E drives the reading motor 103 (see FIG. 2) to rotate in forward direction to drive the first reading-entrance roller pair 16 and the first reading-exit roller pair 23.

When the registration sensor 17 detects the leading edge of the document 1 in the conveyance direction m, the first reading and conveying part E decelerates while the document 1 is conveyed by a predetermined distance, and temporarily stops before entering the first reader 20.

Subsequently, the first reading and conveying part E start conveying the stopped document 1 in response to the reading start signal while accelerating the conveyance speed of the document 1 to a predetermined conveyance speed until the front end of the document 1 reaches the first reader 20 in the conveyance direction m.

The first reading and conveying part E reads the front side of the document 1 and outputs a signal indicating the scanned image during a period from when the front end of the document 1 in the conveyance direction m enters the position of the first reader 20 to when the trailing end of the document 1 in the conveyance direction m exits the position of the first reader 20.

The first reading roller 19 serves as a base that prevents floating of the document 1 at the time of reading by the first reader 20 and obtains correction data 306 (see FIG. 5) used to correct the shading of an image scanned by the first reader 20.

When only one side of the document 1 is to be read, the first reading and conveying part E conveys the document 1 that has passed through to the sheet ejection unit G through the second reading and conveying part F. In so doing, when the sheet ejection sensor 24 detects the front end of the document 1 in the conveyance direction m, the first reading and conveying part E drives the sheet ejection motor 104 (see FIG. 2) to rotate in forward direction to rotate the output roller pair 28 in a counterclockwise direction.

The first reading and conveying part E counts the driving pulses of the sheet ejection motor 104 from the time when the sheet ejection sensor 24 detects the front end of the document 1 in the conveyance direction m. The first reading and conveying part E reduces the conveyance speed by the sheet ejection motor 104 immediately before the trailing end of the document 1 in the conveyance direction m exits from the nip of the roller pair included in the output roller pair 28. By so doing, the first reading and conveying part E performs control such that the document 1 ejected to the output tray 29 does not jump out of the output tray 29.

The second reading and conveying part F has a function to scan the other side of the document 1. In the following description, the other side of the document may be referred to as the rear side of the document 1. The second reading and conveying part F outputs the scanned image of the rear side of the document 1. The second reading and conveying part F includes a sheet ejection sensor 24, a second reader 25, a second reading roller 26, a second reading exit roller pair 27, and a output roller pair 28.

Basically, the configuration or structure of the second reader 25 is equivalent to that of the first reader 20, but only the installation position of the second reader 25 is different from that of the first reader 20 in order to scan the rear side of the document 1. Basically, the configuration or functionality of the second reading roller 26 is equivalent to that of the first roller 19, but only the installation position of the second reading roller 26 is different from that of the first roller 19 in order to scan the rear side of the document 1. The configuration of the second reader 25 may be different from the configuration of the first reader 20, and the configuration of the second reading roller 26 may be different from the configuration of the first reading roller 19.

When reading the rear side of the document 1, the second reading and conveying part F counts the driving pulse of the reading motor 103 (see FIG. 2) after the front end of the document 1 in the conveyance direction m is detected by the sheet ejection sensor 24.

The second reading and conveying part F reads the rear side of the document 1 and outputs a read image signal during a period from when the front end of the document 1 in the conveyance direction m enters the position of the second reader 25 to when the trailing end of the document 1 in the conveyance direction m exits the position of the second reader 25.

The sheet discharge portion G is a portion of the apparatus for ejecting the document 1 whose front and rear sides have been scanned to the outside of the apparatus.

The stacking unit H is a portion of the apparatus for stacking and holding the document 1 that has already been scanned.

As illustrated in FIG. 2, the image reading apparatus 100 according to the present embodiment includes a controller 300 and an operation panel 106. The controller 300 and the operation panel 106 are electrically connected to each other through an interface 107. The controller 300 controls the operation of the image reading apparatus 100.

The controller 300 according to the present embodiment is electrically connected to, for example, a registration sensor 17, a placement sensor 5, a sheet ejection sensor 24, the contact sensor 11, a document-width sensor 13, a first reading-entrance sensor 15, a table sheet-feeding position sensor 8, and a base-plate home position (HP) sensor 6 receives a detection signal sent from each sensor.

Moreover, the controller 300 according to the present embodiment is electrically connected to, for example, a first reader 20, a second reader 25, the picking-up motor 101, a sheet feeding motor 102, a reading motor 103, a sheet ejection motor 104, and a base-plate lift-up motor 105.

The controller 300 controls the operations of the first reader 20 and the second reader 25, and receives a signal indicating the scanned image from each one of the first reader 20 and the second reader 25.

Further, the controller 300 controls the operation of each one of the picking-up motor 101, the sheet feeding motor 102, the reading motor 103, the sheet ejection motor 104, and the base-plate lift-up motor 105.

FIG. 3 is a diagram illustrating a configuration of the first reader 20 according to the present embodiment.

The first reader 20 according to the present embodiment includes a light emitter 201, a light guide 202, a rod lens array 203, and a light receiver 204. The first reader 20 is, for example, a contact image sensor (CIS). However, no limitation is intended thereby, and the first reader 20 may be provided with a reduction optical system.

The light emitter 201 according to the present embodiment serves as a light emitter. Light emitter 201 includes a first light emitter 201a and a second light emitter 201b. The first light emitter 201a is disposed at one end of the light guide 202 in the width direction n approximately orthogonal to the conveyance direction m, and emits the light toward the one end. The second light emitter 201b is disposed at the other end of the light guide 202 in the width direction n, and emits the light toward the other end.

For example, each one of the first light emitter 201a and the second light emitter 201b is a light-emitting diode (LED). However, the light emitter 201 is not limited to a pair of LEDs as long as it can emit light, and the number of the LEDs or the like of the light emitter 201 is not limited to two.

d denotes the distance between the first light emitter 201a and one end of the light guide 202 in the width direction n.

d also denotes the distance between the second light emitter 201b and the other end of the light guide 202 in the width direction n. The distance d is not limited to any particular range or value, and the distance d in the image reading apparatus 100 can be set to any desired range or value depending on, for example, the application or specification of the image reading apparatus 100.

The light guide 202 according to the present embodiment serves as a second light guide that guides the light emitted from the light emitter 201 to the document 1. The light guide 202 has a cylindrical shape whose longer-side direction is parallel to the width direction n, and is a translucent member through which the light can be guided.

The light that is emitted from each one of the first light emitter 201a and the second light emitter 201b and enters from both ends of the light guide 202 in the width direction n is guided in the width direction n while repeating total internal reflection inside the light guide 202. In the process of guiding the light, the light incident on the principal plane of the light guide 202 in the longer-side direction is emitted from the inside to the outside of the light guide 202 at an incident angle smaller than the critical angle.

The light emitter 201 and the light guide 202 constitute an irradiation unit that makes up the document 1 with the irradiation light Ls. The light emitter 201 and the light guide 202 can irradiate the document 1 with light emitted toward the document 1 among light emitted from the inside to the outside of the light guide 202 as irradiation light Ls. The irradiation light Ls is linear light extending in the width direction n.

The rod lens array 203 according to the present embodiment serves as a first light guide that guides the reflected light Lr of the irradiation light Ls emitted from the light emitter 201 and the light guide 202 and reflected by the document 1. The rod lens array 203 includes a plurality of rod lenses 203a aligned in the width direction n.

Each one of the multiple rod lenses 203a is a rod-like unity-magnification imaging optical device through which the light can be guided. For example, each one of the multiple rod lenses 203a is a gradient index lens. Alternatively, each one of the multiple rod lens 203a may be a refractive lens or a diffractive lens.

The reflection light Lr incident on each of the multiple rod lenses 203a from the document 1 side is guided inside the rod lenses 203a and is emitted to the side opposite to the document 1 in the rod lens array 203. The light that is emitted from the rod lens array 203 is incident on the light receiver 204 arranged on the other side of the document 1 with the rod lens array 203 interposed therebetween, and is received by the light receiver 204.

The light receiver 204 according to the present embodiment serves as an output device that outputs a readout signal Is obtained from the reflected light Lr guided by the rod lens array 203. The light receiver 204 is, for example, a line image sensor in which a plurality of light-receiving elements such as a charge-coupled device (CCD) and a complementary metal-oxide semiconductor (CMOS) are aligned as a plurality of pixels in the width direction n, and such a line image sensor outputs a one-dimensional readout signal Is to be used to form a one-dimensional read image.

The light receiver 204 may output a monochrome readout signal Is to be used to form a monochrome read image, or may output a color readout signal Is to be used to form a color read image. The light receiver 204 is not limited to a line image sensor, and may be an area image sensor that outputs a two-dimensional readout signal Is to be used to form a two-dimensional read image.

The multiple light-receiving elements included in the light receiver 204 output an electrical signal corresponding to the light intensity of the received light as a readout signal Is. Analog-to-digital (A/D) conversion is performed on the readout signals (Is, Ic) output from the multiple light-receiving elements to a plurality of digital signals, and the light receiver 204 pieces together the digital signals in the width direction. As a result, a digital line image whose longer-side direction is parallel to the width direction can be captured.

Only the configuration or structure of the first reader 20 is described in the above description, but the configuration or structure and the function of the second reader 25 is equivalent to those of the first reader 20. When the second reader 25 is used for scanning, the second reading roller 26 is used as a base. The first reader 20 will be described below, but the following description of the first reader 20 can be applied to the second reader 25 in a similar manner.

In the present embodiment, there are some cases in which unevenness in brightness called shading is included in the readout signal Is output from the light receiver 204. As the shading is unevenness in brightness that has nothing to do with the document plane of the document 1 to be scanned by the image reading apparatus 100, such shading indicates the error in scanning of the document 1 performed by the image reading apparatus 100.

There are various kinds of factors that cause shading. For example, the unevenness in brightness in the width direction n of the irradiation light Ls emitted from the light emitter 201 and the light guide 202 to the document 1, the unevenness in brightness in the width direction n of the light guided by the rod lens array 203 and incident on the light receiver 204, and the differences in characteristics between a plurality of light-receiving elements provided for the light receiver 204 may cause shading. Factors of the shading based on the rod lens array 203 include, for example, a characteristic difference between the multiple rod lenses 203a, or unevenness in the amount of guided light based on a joint between adjacent rod lenses 203a.

The image reading apparatus 100 corrects the above shading using the first reading roller 19. The first reading roller 19 according to the present embodiment serves as a base for correcting the shading in the readout signal Is output from the light receiver 204. The first reading roller 19 is a rotor configured to have a predetermined distribution of density in the width direction n. The predetermined distribution of density is, for example, a white distribution of density which is substantially uniform in the width direction n, or a black distribution of density which is substantially uniform in the width direction n. However, no limitation is intended thereby, and any distribution of density may be adopted as long as such a distribution of density is determined in advance. In the image reading apparatus 100, a plurality of distributions of density that are different from each other may be arranged on the first reading roller 19, and the shading may be corrected based on the correction data obtained using those multiple distributions of density.

FIG. 4 is a diagram illustrating the shading correction using the first reading roller 19, according to the present embodiment.

As illustrated in FIG. 4, when the shading correction is to be performed, the image reading apparatus 100 arranges the first reading roller 19 instead of the document 1 at a position irradiated with the irradiation light Ls from the light emitter 201 and the light guide 202.

As the first reading roller 19 also serves as a member having a function to prevent, for example, the floating of the document 1 when the document 1 is being scanned. For this reason, it can be said that the state of the image reading apparatus 100 when the shading correction is performed is equivalent to a state in which the document 1 is removed from the nip between the first reader 20 and the first reading roller 19.

In the configuration or structure as illustrated in FIG. 4, the first reader 20 scans the predetermined distribution of density of the first reading roller 19, and outputs a reading signal Ic of the first reading roller 19 from the light receiver 204. By subtracting a predetermined distribution of density of the first reading roller 19 from the readout signal Ic, correction data for correcting the shading can be obtained.

The image reading apparatus 100 stores the obtained correction data in a storage unit 304 (see FIG. 5) at an earlier stage, and subtracts the correction data from the line image obtained from the readout signal Is of the document 1. As a result, the shading can appropriately be corrected. The image reading apparatus 100 can output a one-dimensional read image in which shading in the readout signal Is is corrected. In the image reading apparatus 100, the multiple line images that are obtained by capturing the document 1 being conveyed in the conveyance direction m may be pieced together in the conveyance direction m. By so doing, a two-dimensional scanned image can be output.

Figure 5:
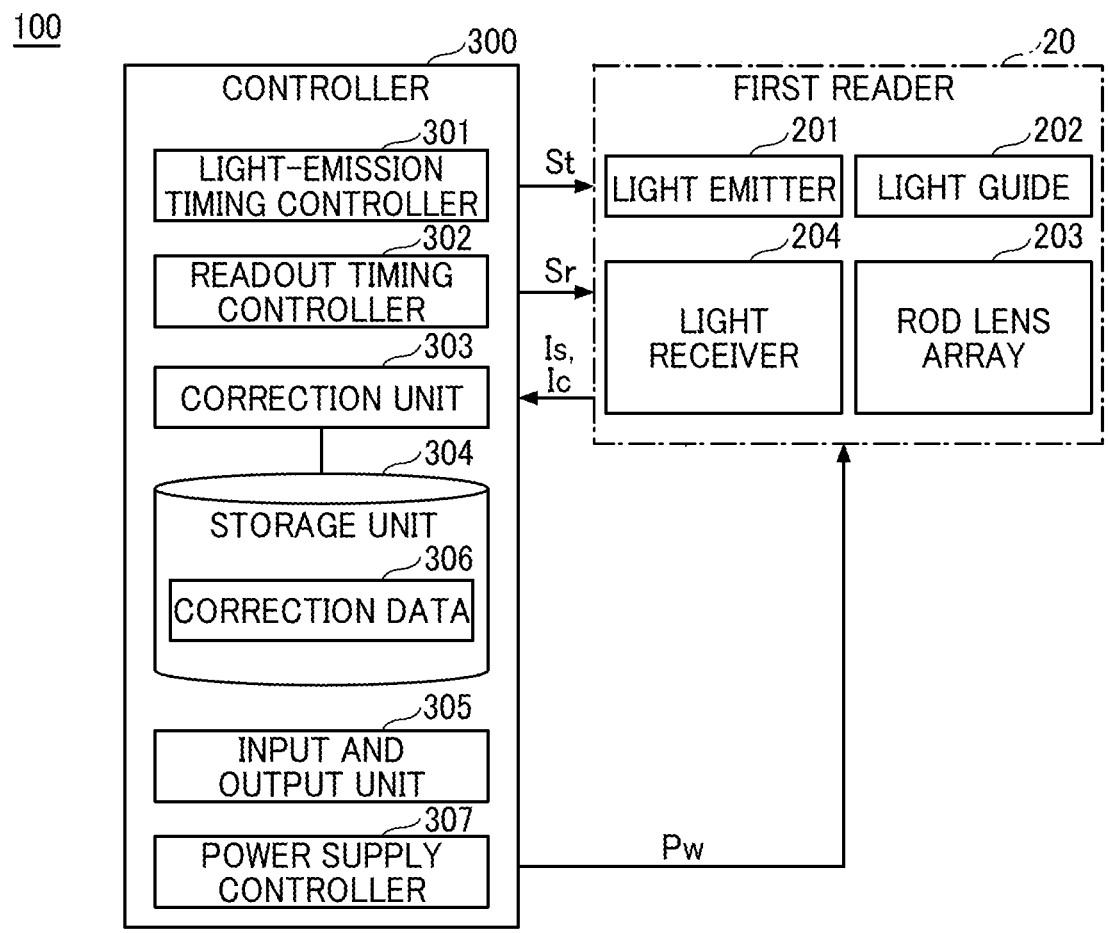
FIG. 5 is a block diagram of a functional configuration of a controller according to the first embodiment of the present disclosure.

FIG. 5 is a block diagram illustrating a functional configuration of the controller 300 according to the present embodiment.

The controller 300 according to the present embodiment serves as a controller that controls the timing at which the light receiver 204 outputs a signal and the timing at which light is emitted from the light emitter 201 and the light guide 202.

As illustrated in FIG. 5, the controller 300 according to the present embodiment includes a light-emission timing controller 301, a readout timing controller 302, a correction unit 303, a storage unit 304, an input and output device 305, and a power supply controller 307.

The controller 300 may implement the multiple functions of the light-emission timing controller 301, the readout timing controller 302, the correction unit 303, the input and output device 305, and the power supply controller 307 as a central processing unit (CPU) launches a program stored in a memory such as a read-only memory (ROM) into a work area such as a random access memory (RAM) and executes the developed program. Alternatively, the controller 300 may implement at least some of the multiple functions of the above-described elements by an electric circuit, or may implement it using a plurality of programs or a plurality of electric circuits. Alternatively, the controller 300 may implement the function of the storage unit 304 by a storage device such as a hard disk drive (HDD).

At least some of the functions of the controller 300 may be implemented by other elements such as the first reader 20.

The light-emission timing controller 301 controls the timing at which each one of the light emitter 201 and the light guide 202 emits the light. For example, the light-emission timing controller 301 outputs an irradiation control signal St to the first reader through the input-and-output device 305. As a result, the timing at which the light emitter 201 and the light guide 202 emit the irradiation light Ls can appropriately be controlled.

More specifically, the light-emission timing controller 301 outputs the irradiation control signal St upon switching the logic in response to the register access from the CPU to the light emitter 201, and control whether the light emitter 201 is to emit light or is not to emit the light. By so doing, the timing at which the irradiation light Ls is emitted can appropriately be controlled.

The readout timing controller 302 controls the timing at which the light receiver 204 outputs a signal. For example, when reading the document 1, the readout timing controller 302 outputs the scanning control signal Sr to the first reader 20 through the input-and-output device 305. By so doing, the timing at which the light receiver 204 outputs the reading signal Is can be controlled. Moreover, when obtaining the correction data, the readout timing controller 302 outputs the scanning control signal Sr to the first reader 20 through the input-and-output device 305. By so doing, the timing at which the light receiver 204 outputs the reading signal Ic can be controlled.

More specifically, the readout timing controller 302 uses a clock signal or a line synchronizing signal supplied to the light receiver 204 as a scanning control signal Sr, and controls the reading timing by controlling the clock signal or the line synchronizing signal by accessing a register from the CPU.

The correction unit 303 according to the present embodiment serves as a corrector that corrects the shading using the correction data 306. The correction data 306 is obtained based on the readout signal Ic of the first reading roller 19 output from the light receiver 204, and is stored in the storage unit 304 in advance. When the readout signal Is of the document 1 is output from the light receiver 204, the correction unit 303 can acquire the correction data 306 with reference to the storage unit 304, and output the readout signal Ic obtained by correcting the readout signal Is using the correction data 306 as a one-dimensional read image through the input-and-output device 305.

In the present embodiment, the correction data 306 is obtained before the readout signal Is of the document 1 is output from the light receiver 204, and is stored in the storage unit 304. However, when the reading signal Is of the document 1 is output by the light receiver 204, the rod lens array 203 and the light guide 202 may be heated by the light emitted by the light emitter 201, and the amount of thermal deformation thereof may change over time. In other words, the amount of thermal deformation of the rod lens array 203 and the light guide 202 may change over time due to the change in temperature over time of the image reading apparatus 100.

For example, when the rod lens array 203 is deformed to expand and contract in the width direction n due to heating and the amount of deformation changes with time, the shading at the time of acquiring the correction data 306 and the shading at the time of reading the document 1 become different. Due to such a difference, the image reading apparatus 100 cannot appropriately correct shading when reading the document 1.

In a similar manner to the above, when the light guide 202 is deformed to expand and contract in the width direction n due to heating and the amount of deformation changes with time, the shading at the time of acquiring the correction data 306 and the shading at the time of reading the document 1 become different. Due to such a difference, the image reading apparatus 100 cannot appropriately correct shading when reading the document 1.

In the present embodiment, the controller 300 heats the rod lens array 203 with the irradiation light Ls emitted from the light emitter 201 and the light guide 202 before the light receiver 204 outputs each of the readout signal Is of the document 1 and the readout signal Ic of the first reading roller 19.

More specifically, when acquiring the correction data 306, the controller 300 controls the first reader 20 so as to irradiate the rod lens array 203 with the irradiation light Ls from the light emitter 201 and the light guide 202 before the light receiver 204 outputs the reading signal Ic of the first reading roller 19. The rod lens array 203 is heated as irradiated with the irradiation light Ls. As a result, the rod lens array 203 expands or contracts, and may be deformed. The light guide 202 is heated as irradiated with the light emitted from the light emitter 201. As a result, the light guide 202 expands or contracts, and may be deformed.

The light receiver 204 outputs the reading signal Ic of the first reading roller 19 in a state in which each of the rod lens array 203 and the light guide 202 is deformed to expand and contract. As described above, the correction data 306 is obtained from the output readout signal Ic and then is stored in the storage unit 304.

When the scanned image of the document 1 is to be obtained, the controller 300 controls the first reader 20 such that the rod lens array 203 will be irradiated with the irradiation light Ls emitted from the light emitter 201 and the light guide 202 before the light receiver 204 outputs the readout signal Is of the document 1. The rod lens array 203 is heated as irradiated with the irradiation light Ls. As a result, the rod lens array 203 expands or contracts, and may be deformed. The light guide 202 is heated as irradiated with the light emitted from the light emitter 201. As a result, the light guide 202 expands or contracts, and may be deformed.

The light receiver 204 outputs a readout signal Is of the document 1 in a state in which each one of the rod lens array 203 and the light guide 202 is deformed to expand and contract.

The correction unit 303 uses the correction data 306 obtained in the state where the rod lens array 203 and the light guide 202 are heated to correct the readout signal Is of the document 1 output in the state where the rod lens array 203 and the light guide 202 are heated. The correction unit 303 outputs the corrected readout signal Ic.

The power supply controller 307 controls the supply of the power Pw to the first reader 20.

The image reading apparatus 100 can obtain the correction data 306 in a state in which each of the rod lens array 203 and the light guide 202 is deformed to expand and contract due to heating, and can correct the readout signal Is of the document 1. Accordingly, in the image reading apparatus 100 according to the present embodiment, the state of deformation of the rod lens array 203 can be made close to the state of deformation of the light guide 202 between the time of acquisition of the correction data 306 and the time of scanning the document 1. As a result, the difference between the amount of deformation of the rod lens array 203 and the amount of deformation of the light guide 202 can be reduced, and the error in the shading correction can sufficiently be reduced.

For example, the controller 300 controls the rod lens array 203 and the light guide 202 to be heated until the deformation of each of the rod lens array 203 and the light guide 202 due to heating is saturated. A state in which the deformation is saturated in the present embodiment refers to a state in which each of the rod lens array 203 and the light guide 202 is sufficiently deformed and the amount of deformation has decreased to a predetermined small value. Due to such a configuration, in the image reading apparatus 100 according to the present embodiment, the state of deformation of the rod lens array 203 can be made close to the state of deformation of the light guide 202 between the time of acquisition of the correction data 306 and the time of scanning the document 1, and the error in the shading correction can preferably be reduced.

The operation of the image reading apparatus 100 is described below with reference to FIG. 6 and FIG. 7.

Figure 6:
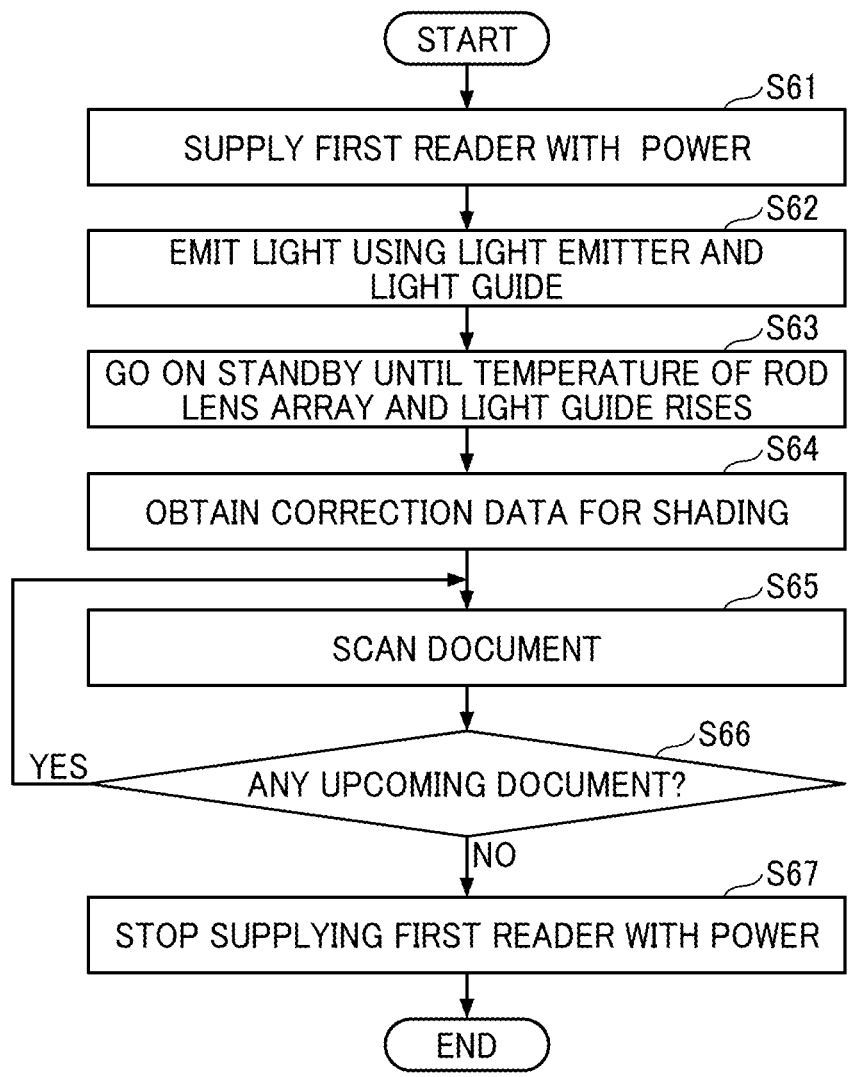
FIG. 6 is the first flowchart of the processes of an image reading apparatus according to the first embodiment of the present disclosure.

FIG. 6 is a first flowchart of the operation of the image reading apparatus 100, according to the present embodiment.

Figure 7:
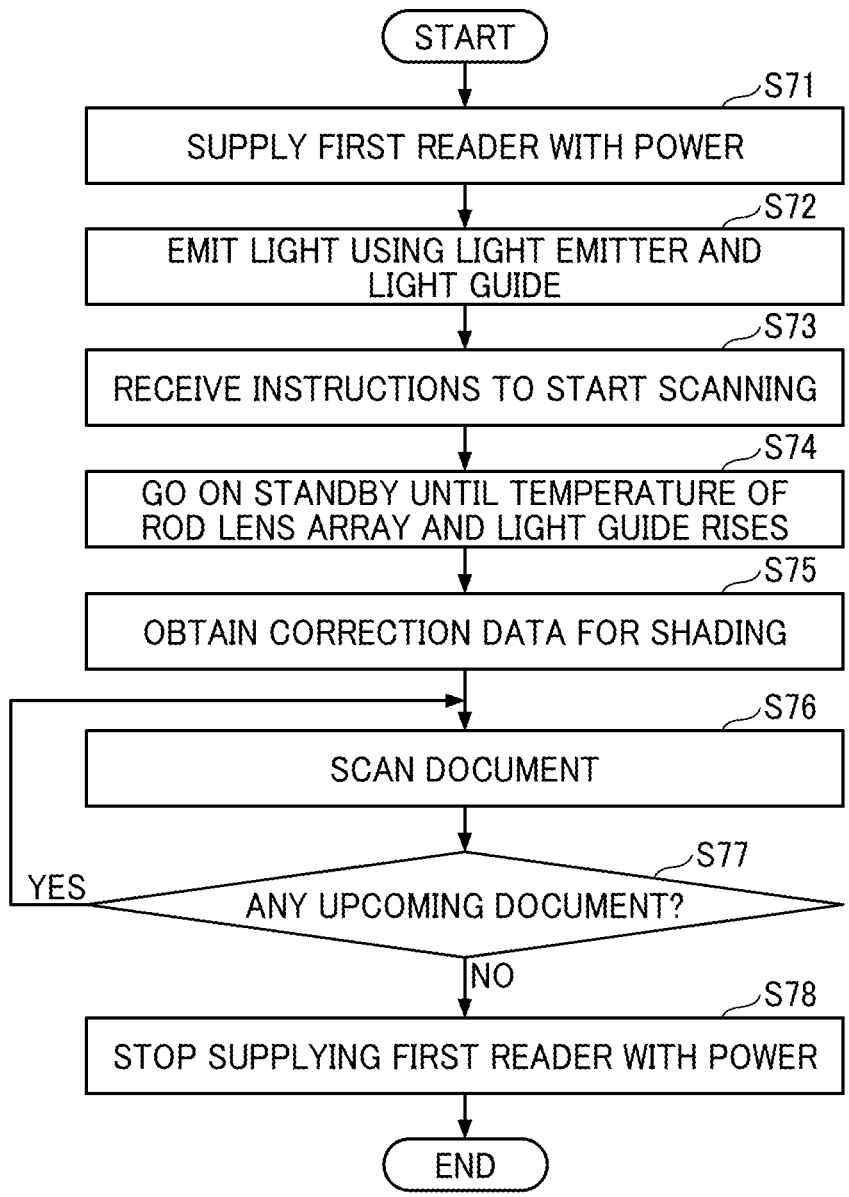
FIG. 7 is the second flowchart of the processes of an image reading apparatus according to the first embodiment of the present disclosure.

FIG. 7 is a second flowchart of the operation of the image reading apparatus 100, according to the present embodiment.

In the image reading apparatus 100 according to the present embodiment, it is assumed that the first reader 20 is disabled drive power is not supplied to the first reader except when instructions to start scanning are given. The image reading apparatus 100 starts the operation of FIG. 5 upon receipt of the instructions to start scanning. The instructions to start scanning may be an operation or input made through an operation panel of the image reading apparatus 100 or may be a control signal input from an external device.

Firstly, in a step S61, the image reading apparatus 100 causes the power supply controller 307 to supply the power Pw to the first reader 20 in response to the received instructions to start scanning.

Subsequently, in a step S62, the image reading apparatus 100 causes the light-emission timing controller 301 to output the irradiation control signal St to the first reader 20 through the input-and-output device 305. The light emitter 201 and the light guide 202 irradiate the first reading roller 19 with the irradiation light Ls in response to the irradiation control signal St.

Subsequently, in a step S63, the image reading apparatus 100 goes on standby until the rod lens array 203 and the light guide 202 are heated by the irradiation light Ls and the temperature rises. The waiting time is a predetermined length of time until the deformation of each of the rod lens array 203 and the light guide 202 is saturated.

Subsequently, in a step S64, the image reading apparatus 100 uses the readout timing controller 302 to output the scanning control signal Sr to the first reader 20 through the input-and-output device 305 after the rod lens array 203 and the light guide 202 rise have risen in temperature sufficient to saturate the deformation of each of the rod lens array 203 and the light guide 202. The light receiver 204 outputs a reading signal Ic of the first reading roller 19 in response to the scanning control signal Sr. The image reading apparatus 100 uses the storage unit 304 to store the correction data 306 obtained from the readout signal Ic.

Subsequently, in a step S65, the image reading apparatus 100 causes the readout timing controller 302 to output the scanning control signal Sr to the first reader through the input-and-output device 305. The light receiver 204 outputs a readout signal Is of the document 1 according to the read control signal Sr. The image reading apparatus 100 refers to the storage unit 304 to obtain the correction data 306, and corrects the readout signal Is based on the obtained correction data 306. As a result, the scanned image of the document 1 can be obtained from the corrected readout signal Ic.

Subsequently, in a step S66, the controller 300 of the image reading apparatus 100 determines whether or not there is a next document 1.

When it is determined that there is such a next document 1 in the step S66 ("YES" in the step S66), the image reading apparatus 100 performs the processes in the step S65 and the subsequent steps again. By contrast, when it is determined that there is no such next document 1 ("NO" in the step S66), in a step S67, the image reading apparatus 100 uses the power supply controller 307 to terminate the supply of the power Pw to the first reader 20. Subsequently, the image reading apparatus 100 ends the operation.

As described above, the image reading apparatus 100 can correct the shading of the read image and output the read image obtained from the corrected readout signal Ic.

In the second flowchart according to the first embodiment of the present disclosure as illustrated in FIG. 7, the image reading apparatus 100 starts the processes depicted in FIG. 7 upon receipt of the placement detection signal output from the placement sensor 5.

Firstly, in a step S71, the image reading apparatus 100 causes the power supply controller 307 to supply the power Pw to the first reader 20 in response to the placement detection signal output from the placement sensor 5.

Subsequently, in a step S72, the image reading apparatus 100 causes the light-emission timing controller 301 to output the irradiation control signal St to the first reader 20 through the input-and-output device 305. The light emitter 201 and the light guide 202 irradiate the first reading roller 19 with the irradiation light Ls in response to the irradiation control signal St.

Subsequently, in a step S73, the controller 300 of the image reading apparatus 100 receives instructions to start reading the document 1.

Subsequently, in a step S74, the image reading apparatus 100 goes on standby until the rod lens array 203 and the light guide 202 are heated by the irradiation light Ls and the temperature rises.

The processes in the step S75 and the subsequent steps in FIG. 7 are equivalent to the processes in the step S64 and the subsequent steps in FIG. 6. Thus, the overlapping description of those equivalent processes in FIG. 7 are omitted.

As described above, the image reading apparatus 100 can correct the shading of the read image and output the read image obtained from the corrected readout signal Ic. In the second flowchart according to the first embodiment of the present disclosure as illustrated in FIG. 7, the timing at which the document 1 is placed on the document placement unit A is used as a trigger to start heating the light emitter 201 and the light guide 202. Accordingly, the standby time until the rod lens array 203 and the light guide 202 rise in temperature can be shortened. As a result, the error in the shading correction can sufficiently be reduced while the productivity in scanning the document 1 can also be increased.

Some advantageous effects of the image reading apparatus 100 are described below.

In the related art, image reading apparatuses that correct the shading on a scanned image are known. As the brightness of irradiation light that is emitted by the light emitter provided for the image reading apparatus may change over time, it is desired that the shading correction be performed each time a document is scanned.

However, if the shading correction is performed every time a document is scanned, the frequency of obtaining the correction data that is used to correct the shading increases in, for example, a clearance period where no document is to be scanned. As a result, the productivity of the document scanning may deteriorate.

In particular, when the scanning position of a base and the scanning position of a document, which are used for the shading correction in the image reading apparatus, are different from each other in the conveyance direction of the document, it is necessary to reciprocate a carriage on which a reader is mounted between the scanning position of the base and the scanning position of the document repeatedly. In such cases, the productivity decreases significantly.

In order to prevent the productivity of document scanning from decreasing, technologies have been proposed that correct the intermittent shading. In such technologies, correction data is obtained at prescribed time intervals. However, the above conventional technologies to correct the intermittent shading cannot correct the influence of the thermal deformation of a light guiding member such as a rod lens array or a light guide due to change in temperature over time.

For example, in the case of rod lens arrays, as the rod lens array is deformed to expand and contract in the width direction intersecting the conveyance direction of the document, the positions of the multiple rod lenses provided for the rod lens array and the positions of the multiple light-receiving elements provided for the light receiver may be shifted from each other in the width direction. As a result, the peak positions of the light intensity may be shifted from each other in the width direction in the shading between the correction data and the readout signal output from the light receiver, and streak-like abnormal image such as a black streak or a white streak extending in the conveyance direction may appear on the scanned image.

By contrast, in the case of light guides, as the load is applied due to the deformation of the light guide on the connecting part between the light guide and a fixation member that fixes the light guide, the direction in which the light is emitted from the light guide may change over time. As a result, the shading in the width direction changes over time. Accordingly, the shading differs between the correction data and the readout signal output from the light receiver, and an error in the correction of shading occurs.

The image reading apparatus 100 according to the present embodiment includes the light emitter 201 and the light guide 202 that serve as an irradiation unit, and irradiate the document 1 with irradiation light Ls, and the rod lens array 203 that serves as a first light guide and guides the reflected light Lr of the irradiation light Ls emitted from the light emitter 201 and the light guide 202 and reflected by the document 1. Moreover, the image reading apparatus 100 according to the present embodiment includes the light receiver 204 that serves as an output device and outputs the readout signal Is obtained from the reflected light Lr guided by the rod lens array 203, and the first reading roller 19 that serves as a base for correcting the shading in the readout signal Is output from the light receiver 204. Further, the image reading apparatus 100 according to the present embodiment includes the correction unit 303 that outputs the readout signal Ic of the scanned image in which the shading of the document 1 in the readout signal Is is corrected using the correction data 306 obtained based on the readout signal Is of the first reading roller 19 output from the light receiver 204, and the controller 300 that serves as a controller and controls the timing at which the light receiver 204 outputs a signal and the timing at which light is emitted from the light emitter 201 and the light guide 202.

The controller 300 according to the present embodiment heats the rod lens array 203 with the irradiation light Ls emitted from the light emitter 201 and the light guide 202 before the light receiver 204 outputs the readout signal Is of each of the document 1 and the first reading roller 19. The correction unit 303 uses the correction data 306 obtained in the state where the rod lens array 203 is heated to correct the shading in the readout signal Is of the document 1 output from the light receiver 204 in the state where the rod lens array 203 is heated.

The image reading apparatus 100 can obtain the correction data 306 in a state in which each of the rod lens array 203 and the light guide 202 is deformed to expand and contract due to heating, and can correct the readout signal Is of the document 1 based on the obtained correction data 306. Accordingly, in the image reading apparatus 100 according to the present embodiment, the state of deformation of the rod lens array 203 can be made close to the state of deformation of the light guide 202 between the time of acquisition of the correction data 306 and the time of scanning the document 1. As a result, the difference in the amount of deformation of each of the rod lens array 203 and the light guide 202 between the time of acquisition of the correction data 306 and the time of scanning the document 1 can be reduced, and the error in the shading correction due to the changes in the temperature of the image reading apparatus 100 can be reduced.

For example, it is desired that the controller 300 control the rod lens array 203 and the light guide 202 to be heated until the deformation of each of the rod lens array 203 and the light guide 202 due to heating is saturated. Due to such a configuration, in the image reading apparatus 100 according to the present embodiment, the state of deformation of the rod lens array 203 can be made close to the state of deformation of the light guide 202 between the time of acquisition of the correction data 306 and the time of scanning the document 1, and the error in the shading correction due to the changes in the temperature of the image reading apparatus 100 can further be reduced.

When the image reading apparatus 100 reads a plurality of documents 1, that is, when the light receiver 204 outputs the readout signal Is of each of the multiple documents 1, the controller 300 preferably heats the rod lens array 203 and the light guide 202 with the irradiation light Ls irradiated from the light emitter 201 and the light guide 202 only once before the first readout signal Is among the readout signals Is of each of the multiple documents 1 is output from the light receiver 204. It is desired that the correction unit 303 use the correction data 306 obtained in the state where each of the rod lens array 203 and the light guide 202 is heated to correct the shading in the readout signal Is of the document 1 output from the light receiver 204 in the state where the rod lens array 203 and the light guide 202 are heated. Due to such a configuration, it is no longer necessary for the image reading apparatus 100 to obtain the correction data 306 every time a plurality of documents 1 are scanned, and the length of time it takes to obtain the correction data 306 can be shortened. As a result, the image reading apparatus 100 can prevent the error in the shading correction due to the change in temperature of the image reading apparatus 100 while increasing the productivity of scanning the multiple documents 1.

In order to output the readout signal Is of the being-conveyed document 1 from the light receiver 204, it is desired that the controller 300 start the irradiation of the irradiation light Ls by the light emitter 201 and the light guide 202 when the document 1 is placed at, for example, the position of the document placement unit A where the conveyance of the document 1 starts. Thus, since the heating of the rod lens array 203 and the light guide 202 can be started immediately after the document 1 is placed on the document placement unit A, the standby time until the rod lens array 203 and the light guide 202 are deformed by heating can be shortened. As a result, the image reading apparatus 100 according to the present embodiment can reduce the error in the shading correction due to the changes in the temperature of the image reading apparatus 100 while increasing the productivity of scanning the multiple documents 1.

The controller 300 according to the present embodiment may change the timing at which the light emitter 201 starts light emission depending on the distance d between the light emitter 201 and the light guide 202. The time during which the light guide 202 is deformed by heating varies depending on the distance d. For example, when the distance d is short, the heating efficiency increases. As a result, the light guide 202 can be deformed in a timely manner. By contrast, when the distance d is long, the heating efficiency decreases. As a result, the deformation of the light guide 202 tends to be delayed. The distance d is determined in accordance with the arrangement of components of the image reading apparatus 100.

For example, when the distance d is 3 millimeters (mm), the length of time since the emission of the irradiation light Ls to the output of the readout signal Is by the light receiver 204 is set to 3 seconds in the image reading apparatus 100.

In the image reading apparatus 100 according to the present embodiment, the timing at which the light emitter 201 starts light emission is changed depending on the distance d, and the length of time since the emission of the irradiation light Ls to the output of the readout signal Is by the light receiver 204 is changed. As a result, the heating of the light guide 202 can be started at an appropriate timing according to the arrangement of the components in the image reading apparatus 100. As a result, the image reading apparatus 100 can reduce the error in the shading correction due to the changes in the temperature of the image reading apparatus 100.

Second Embodiment

An image reading apparatus 100a according to a second embodiment is described below. In view of the first embodiment of the present disclosure as described above, like reference signs denote like elements, and redundant description may be omitted where appropriate.

Figure 8:
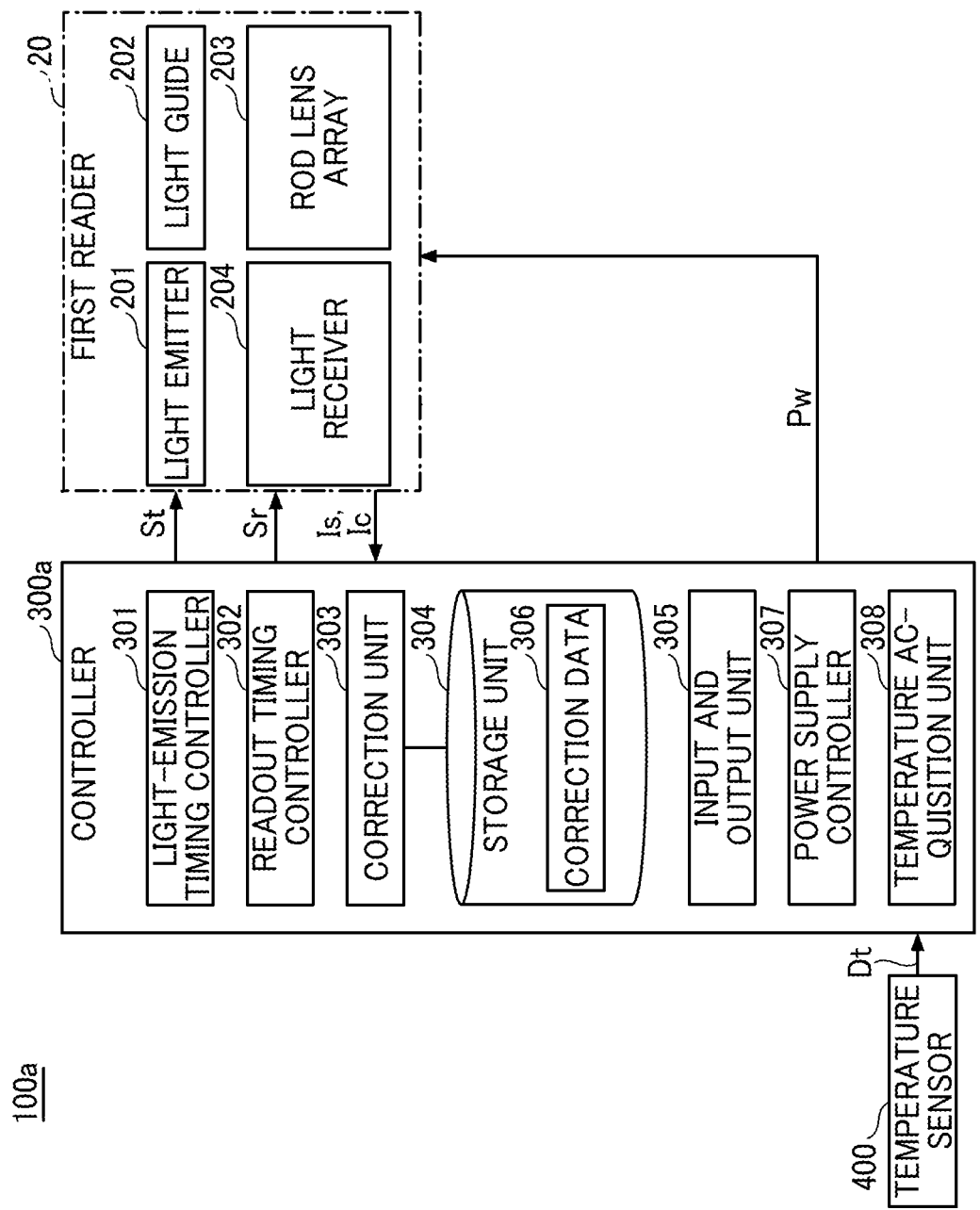
FIG. 8 is a block diagram of a functional configuration of a controller according to a second embodiment of the present disclosure.

FIG. 8 is a block diagram illustrating a functional configuration of a controller 300a provided for an image reading apparatus 100a according to a second embodiment of the present disclosure.

The image reading apparatus 100a according to the present embodiment includes a temperature sensor 400.

The temperature sensor 400 according to the present embodiment serves as a temperature sensor that detects at least one of the temperature of the rod lens array 203 and the ambient temperature of the rod lens array 203. The temperature sensor 400 is not limited to any particular sensor as long as it can output a detected temperature, and various kinds of temperature sensors such as a resistance thermometer or a radiation thermometer may be used.

The temperature sensors 400 may be disposed at any positions in the 100a of the image reading apparatus as long as at least one of the temperature of the rod lens array 203 and the ambient temperature of the rod lens array 203 can be detected.

The controller 300a includes a temperature acquisition unit 308 that receives a temperature detection signal Dt output from the temperature sensors 400 to obtain the degree of temperature. The controller 300a controls the light emitter 201 and the light guide 202 to start emitting the irradiation light Ls when the temperature detected by the temperature sensors 400 becomes equal to or higher than a predetermined temperature before the readout signals Is of each one of the document 1 and the first reading roller 19 is output from the light receiver 204.

In the image reading apparatus 100 according to the first embodiment, when the timing at which the irradiation light Ls is emitted from the light emitter 201 and the light guide 202 is determined based on the elapsed time, there are some cases in which the error in the correction of shading cannot sufficiently be reduced. For example, when the ambient temperature of the image reading apparatus 100 is lower than the temperature at which the irradiation timing is determined, there are some cases in which the temperatures of the light emitter 201 and the light guide 202 do not sufficiently increase at the predetermined timing of light emission. As a result, the deformation of each of the rod lens array 203 and the light guide 202 differs between the time of acquisition of the correction data 306 and the time of scanning the document 1, and an error in the correction of shading occurs.

In the present embodiment, the image reading apparatus 100a starts the emission of the irradiation light Ls based on the temperature detected by the temperature sensor 400. Accordingly, regardless of the ambient temperature of the image reading apparatus 100, for example, the irradiation light Ls can be emitted when the deformation of each of the rod lens array 203 and the light guide 202 is saturated. As a result, the image reading apparatus 100a can reduce the error in the shading correction due to the changes in the temperature of the image reading apparatus 100a. The other aspects of the present embodiment are similar to those of the first embodiment of the present disclosure as described above.

Third Embodiment

An image forming apparatus 500 according to a third embodiment of the present disclosure is described below. The image forming apparatus 500 according to the present embodiment is provided with the image reading apparatus 100 according to the above embodiments of the present disclosure, and forms an image on a recording sheet, which serves as a recording medium, based on the image read by the image reading apparatus 100.

Figure 9:
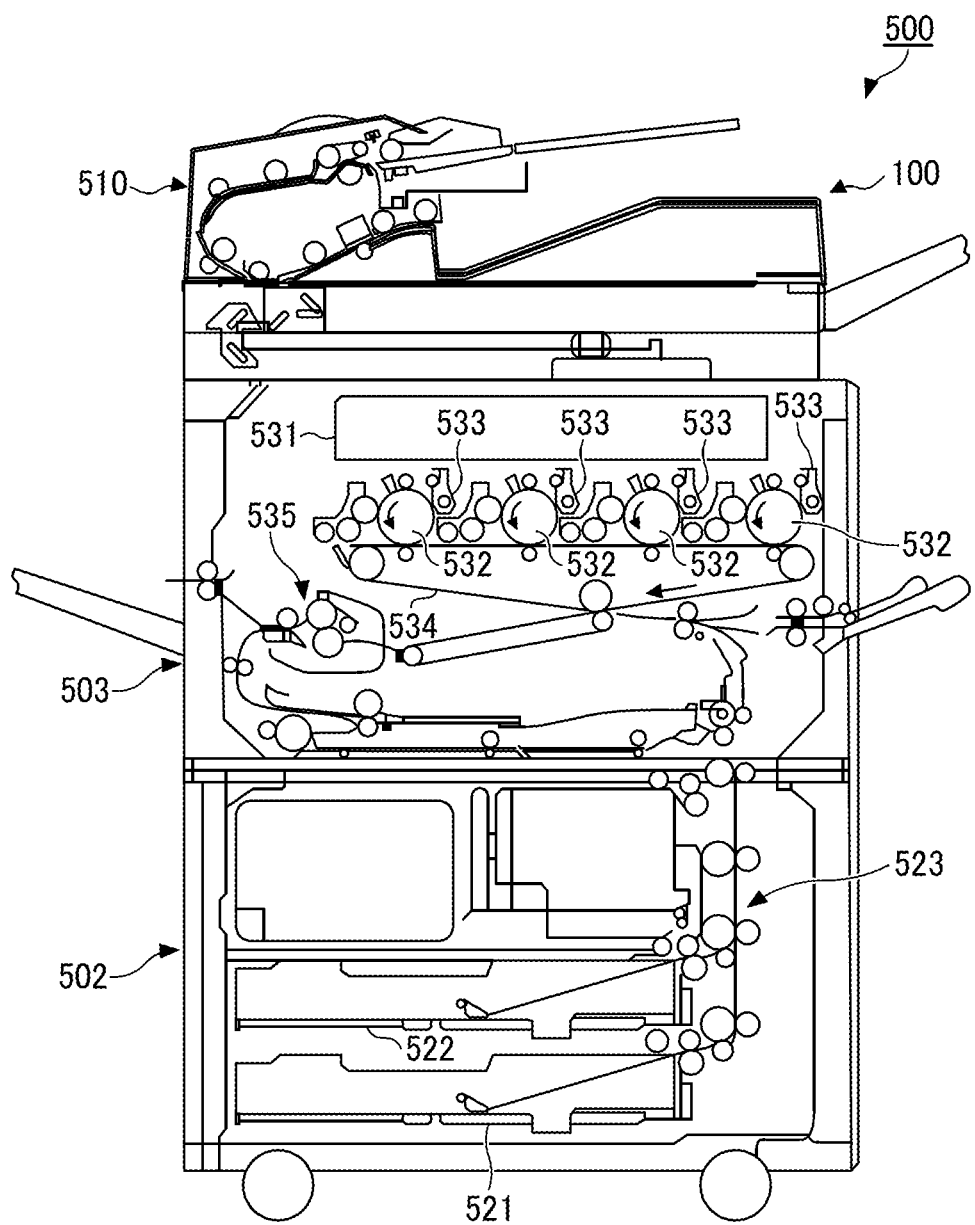
FIG. 9 is a diagram illustrating a configuration of an image forming apparatus according to a third embodiment of the present disclosure.

FIG. 9 is a diagram illustrating a configuration or structure of an image forming apparatus 500 according to a third embodiment of the present disclosure.

More specifically, FIG. 9 is a perspective front view of the image forming apparatus 500.

As illustrated in FIG. 9, the image forming apparatus 500 includes the image reading apparatus 100, an automatic document feeder (ADF) 510 that serves as an image reading apparatus, a sheet feeder 502, and an image forming device 503. The image forming apparatus 500 may include the image reading apparatus 100a according to the second embodiment of the present disclosure instead of the image reading apparatus 100.

The sheet feeder 502 includes a sheet tray 521 and a sheet tray 522 that store a plurality of recording sheets with different sizes, and a sheet feed unit 523 that is composed of various kinds of rollers and conveys the recording sheets stored in the sheet tray 521 and the sheet tray 522 to the position at which an image is to be formed by the image forming device 503.

The image forming device 503 includes an exposure device 531, a photoconductor drum 532, a developing device 533, a transfer belt 534, and a fixing device 535.

In the image forming device 503 according to the present embodiment, the exposure device 531 is used to expose the photoconductor drum 532 based on the scanned image of a document obtained by an image reading unit provided inside the ADF 510. As a result, a latent image can be formed on the photoconductor drum 532.

Further, the image forming device 503 supplies toner of different colors to the photoconductor drum 532 by the developing device 533 to perform development of an image. Then, the image forming device 503 uses the transfer belt 534 to transfer the image developed on the photoconductor drum 532 to the recording sheet supplied from the sheet feeder 502, and fuses or melts the toner on the toner image transferred to the recording sheet by the fixing device 535 to fix the color image on the recording sheet.

As the image forming apparatus 500 is provided with the image reading apparatus 100, a high-quality image can be formed on a recording sheet based on the scanned image in which an error in the shading correction due to change in temperature of the image reading apparatus 100 is reduced. The other aspects of the present embodiment are similar to those of the image reading apparatus 100 and the image reading apparatus 100a according to the first and second embodiments of the present disclosure.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

The multiple functions according to the above embodiments of the present disclosure can be implemented by one or a plurality of processing circuits. The processing circuit herein includes, for example, devices such as a processor that is programmed to execute software to implement functions, like a processor with electronic circuits, an application specific integrated circuit (ASIC) that is designed to execute the above functions, a digital signal processor (DSP), a field-programmable gate array (FPGA), and a circuit module known in the art.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. An image reading apparatus comprising:
   a light emitter configured to irradiate a document with light;
   a first light guide configured to guide the light reflected by the document;
   an output device configured to output a readout signal obtained from the light reflected and guided by the first light guide;
   a base configured to correct shading in the readout signal; and
   circuitry configured to
      output a scanned image in which the shading of the document in the readout signal is corrected, based on correction data obtained from the readout signal of the base output from the output device,
      control a timing at which the light emitter emits the light and a timing at which the output device outputs a signal,
      heat the first light guide with the light emitted from the light emitter before the output device outputs the readout signal of each of the document and the base, and
      correct the shading in the readout signal of the document output from the output device when the first light guide is heated, based on the correction data obtained when the first light guide is heated.

2. The image reading apparatus according to claim 1, wherein the circuitry is configured to heat the first light guide until an amount of deformation of the first light guide due to heating is saturated.

3. The image reading apparatus according to claim 1, wherein the output device is configured to output the readout signal of each of a plurality of documents including the document,
   wherein the circuitry is configured to heat the first light guide once with the light emitted from the light emitter before the readout signal of the plurality of documents is initially output from the output device, and
   wherein the circuitry is configured to correct the shading in the readout signal of the document output from the output device when the first light guide is heated, based on the correction data obtained when the first light guide is heated.

4. The image reading apparatus according to claim 1, wherein the circuitry is configured to control the light emitter to start emitting the light in response to placement of the document at a position where conveyance of the document starts, and
   wherein the readout signal of the document being conveyed is output from the output device.

5. The image reading apparatus according to claim 1, further comprising
   a temperature sensor configured to detect at least one of a temperature of the first light guide or an ambient temperature of the first light guide,
   wherein, before the readout signal of each of the document and the base is output from the output device, the circuitry is configured to control the light emitter to start emitting the light when at least one of the temperature of the light guide detected by the temperature sensor or the ambient temperature of the first light guide detected by the temperature sensor becomes equal to or greater than a prescribed temperature.

6. The image reading apparatus according to claim 1, wherein the light emitter includes:
   a light emitter configured to emit the light; and
   a second light guide configured to guide the light emitted from the light emitter to the document,
   wherein the circuitry is configured to heat the second light guide with the light emitted from the light emitter before the readout signal of the document is output from the output device, and
   wherein the circuitry is configured to correct the shading in the readout signal of the document output from the output device in a state where the second light guide is heated, using the correction data obtained in a state where the second light guide is heated.

7. The image reading apparatus according to claim 6, wherein the circuitry is configured to change a timing at which the light emitter starts emitting the light, based on a distance between the light emitter and the second light guide.

8. An image forming apparatus comprising the image reading apparatus according to claim 1.

9. The image reading apparatus according to claim 2, wherein the image reading apparatus goes on standby for a waiting time, wherein the waiting time is a predetermined length of time until the deformation of the first light guide due to heating is saturated.

\* \* \* \* \*